Patented Jan. 12, 1937

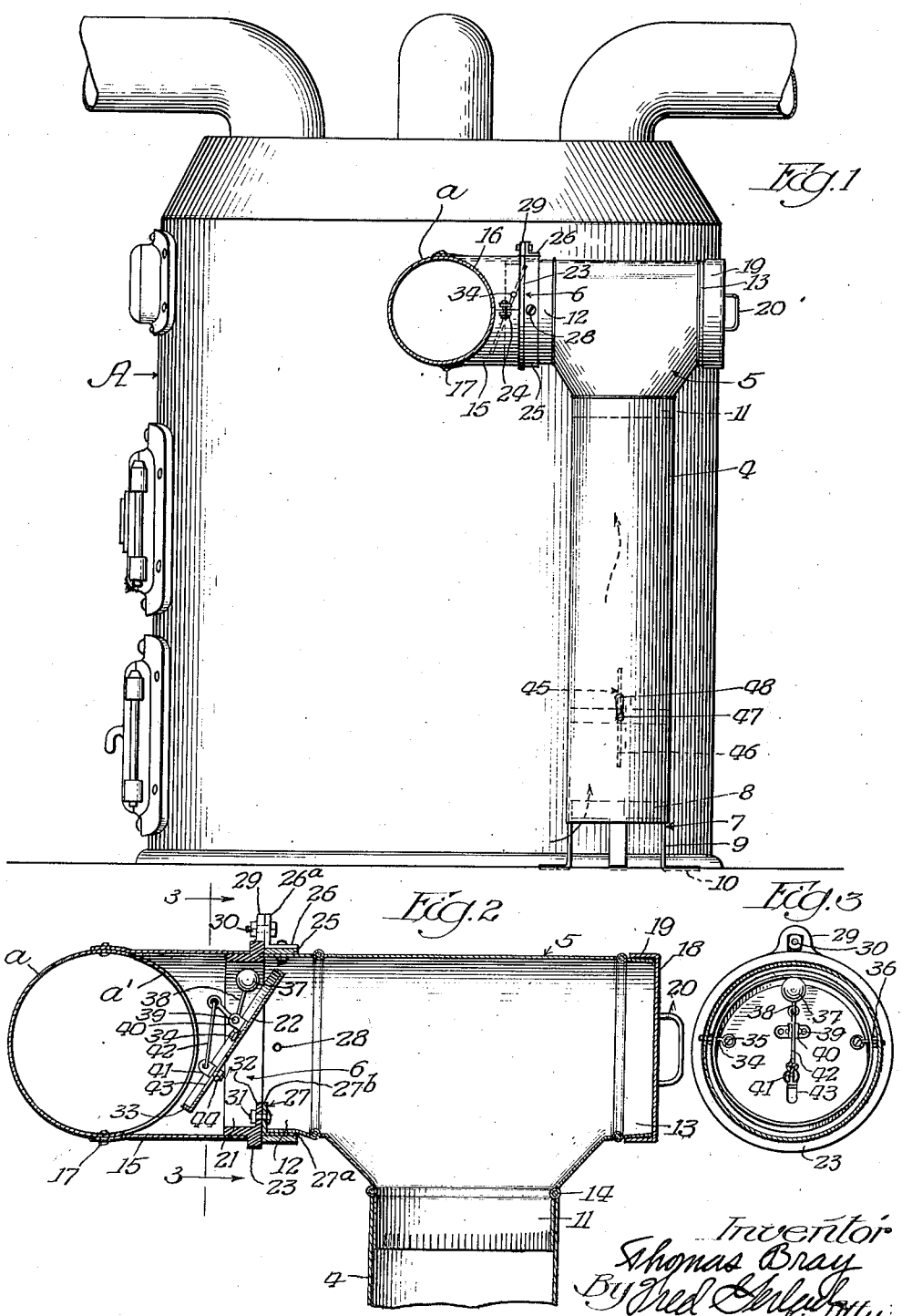

2,067,872

UNITED STATES PATENT OFFICE 2,067,872

DRAFT REGULATING SYSTEM

Thomas Bray, Arlington Heights, Ill., assignor to Arthur Bray, Arlington Heights, Ill.

Application October 21, 1935, Serial No. 45,840

5 Claims. (Cl. 126—312)

The present invention relates generally to systems for regulating or controlling the draft in heating apparatus. More particularly the invention relates to that type of draft regulating system which is associated with the conduit for discharging the various gases and products of combustion from the heating apparatus to the chimney of the building in which the apparatus is disposed, and comprises (1) a vertically extending pipe which serves to introduce air into the conduit by way of a side hole in the latter and has its lower or inlet end open and spaced slightly above the floor of the room in which the apparatus is disposed and its upper end connected by a pipe fitting to the portion of the conduit which defines the side hole; and (2) an automatic draft regulator of the pivoted plate variety which serves to maintain a uniform or constant draft by automatically regulating or controlling the flow or passage of air through the vertical pipe and into the conduit in response to variations or fluctuations in the pressure of the gases and products of combustion passing through the conduit, and embodies an adjustable counterweight whereby it may be set or adjusted to maintain a uniform draft of any desired intensity.

One object of the invention is to provide a draft regulating system of this type which is an improvement upon, and is more practical than, previously designed systems of the same general character by reason of the fact that the fitting at the upper end of the vertical pipe is in the form of a T and has means on one of the side branches thereof for attachment to the conduit and the automatic draft regulator is disposed in the branch of the T fitting having the attaching means.

Another object of the invention is to provide a draft regulating system of the last mentioned character in which the other side branch of the T-fitting is provided with a removable closure cap and upon removal of the cap therefrom provides access to the draft regulator and permits the counterweight to be adjusted.

A further object of the invention is to provide a draft regulating system of the type and character under consideration in which the vertically extending pipe for delivering air into the outlet conduit under control of the automatic draft regulator is provided with a damper whereby it may be closed and the regulator rendered inoperative whenever it is desired to increase the draft in the heating apparatus as is desirable in connection with starting the apparatus.

A still further object of the invention is to provide a draft regulating system which is generally of new and improved construction and may be produced at a low and reasonable cost as well as installed in a simple manner.

Other objects of the invention and the various advantages and characteristics of the present draft regulating system will be apparent from a consideration of the following detailed description.

The invention consists in the several novel features which are hereinafter set forth and are more particularly defined by claims at the conclusion hereof.

In the drawing which acccompanies and forms a part of this specification or disclosure and in which like numerals of reference denote corresponding parts throughout the several views:

Figure 1 is a view partly in elevation and partly in section showing a heating apparatus having a draft regulating system embodying the invention applied thereto;

Figure 2 is a vertical longitudinal sectional view of the T-fitting and automatic regulator of the system; and Figure 3 is a vertical transverse section on the line 3—3 of Figure 2, showing in detail the construction and arrangement of the adjustable counterweight whereby the automatic regulator may be set or adjusted so as to maintain a uniform draft of any desired intensity in the outlet conduit of the heating apparatus.

The draft regulating system which forms the subject matter of the invention, embodies as the main or essential parts thereof a vertically extending pipe 4, a T-fitting 5, and an automatic draft regulator 6 and operates, as hereinafter described, to maintain automatically a uniform or constant draft in a heating apparatus A. The latter is shown more or less diagrammatically in the drawing and includes an outlet conduit $a$ for delivering the various gases and products of combustion from the combustion chamber of the apparatus to the chimney of the building in which the apparatus A is installed. As shown in the drawing the outlet conduit $a$ extends horizontally and has a hole $a'$ at one side thereof.

The pipe 4 and the T-fitting 5 are adapted to permit air to flow into the interior of the conduit $a$ in order to decrease the draft in the heating apparatus and the automatic draft regulator 6 is adapted, as hereinafter described and in response to variations or fluctuations in the pressure of the gas and products of combustion passing through the conduit to the chimney to control the amount of air flowing into the conduit and thus to maintain automatically constant or uniform draft within the heating apparatus. The pipe 4 is of the stovepipe variety and is positioned alongside of the heating apparatus A and directly opposite the portion of the conduit *a* which forms or defines the side hole *a'*. The lower end of the pipe 4 is spaced a slight distance above the floor of the room in which the heating apparatus A is disposed, and is supported on a supporting structure 7. This supporting structure comprises an annulus 8 and a plurality of legs 9. The annulus fits within and is suitably secured to the lower end of the pipe 4. The legs 9 project downwardly from the annulus and have the lower ends thereof bent outwards to form feet 10. The lower end of the pipe 4 constitutes the inlet end of the pipe. The upper end of the pipe terminates slightly beneath the outlet conduit *a* of the heating apparatus A and underlies the T-fitting 5. The latter is formed of sheet metal and consists of a depending intermediate branch 11 and a pair of horizontally extending, oppositely facing side branches 12 and 13. The lower end of the intermediate branch 11 is crimped or otherwise formed so that it is tapered and fits snugly within the upper end of the vertically extending pipe 4. The upper end of the branch 11 is provided with an outwardly extending, annular bead 14 which forms a stop or shoulder for limiting downward movement of the branch 11 into the upper end of the pipe 4. The side branch 12 is disposed on a level with the outlet conduit *a* and is connected to the latter by a pipe section 15. This pipe section is aligned with and forms a continuation of the branch 12 and is equal in diameter to the outlet conduit *a*. The outer end of the pipe section 15, that is the end remote from the side branch 12 of the T-fitting 5, registers with the side hole *a'* in the outlet conduit *a* and is cut or shaped so as to form a semicircular seat 16 for the conduit. The pipe section 15 is attached to the outlet conduit *a* by means of rivets 17 which are carried by the portions of the pipe section which lap the top and bottom portions of the conduit. The side hole *a'*, as shown in Figure 1 of the drawing, is smaller in diameter than the pipe section 15 and the edges of the outer end of the pipe section abut against the portion of the outlet conduit *a* which defines the side hole *a'* in such manner that there is no leakage of air around the side hole and all air passing upwardly through the pipe 4 flows from the T-fitting 5 through the pipe section 15 and into the outlet conduit *a* via the side hole *a'*. The side branch 13 of the T-fitting 5 is closed by a cap 18 so that during normal operation of the regulating system the air that is admitted into the T-fitting 5 passes to the outlet conduit *a* only by way of the vertically extending pipe 4. The cap 18 is formed of sheet metal and embodies an annular marginal flange 19 which fits around the outer end of the side branch 13 of the T-fitting and serves removably to hold the cap in place. The outer end of the side branch 13 is tapered so that the flange 19 grips it snugly or securely when the cap is mounted in place on the side branch 13 of the fitting 5. A handle 20 is secured to the central portion of the cap so that the cap may be readily removed from the fitting whenever desired.

The automatic draft regulator 6 is disposed between the pipe section 15 and the side branch 12 of the T-fitting 5 and consists of a supporting ring 21 and a valve plate 22. The ring 21 is formed of cast metal and is provided at one end thereof with an annular outwardly extending flange 23. The contiguous or adjacent end of the pipe section 15 fits around the other end of the ring 21 and abuts against the flange 23, as shown in Figure 2. The pipe section is split at one side thereof and is clamped in place around the ring 21 by means of a screw which extends through a pair of oppositely facing, outwardly extending ears 24 on the split portion of the pipe section 15. The ring 21 is secured to the side branch 12 of the T-fitting 5 by means of a band 25 and a pair of angle brackets 26 and 27. The band 25 encircles the outer end of the side branch 12 of the T-fitting and is secured in place by bolts 28. The bracket 26 is welded or otherwise secured to the top portion of the band 25 and embodies a vertically extending leg 26ª which fits against an upstanding lug 29 on the flange 23 of the ring and is secured to the lug by means of a bolt 30. The bracket 27 is positioned diametrically opposite the bracket 26 and consists of a horizontal leg 27ª and a vertical leg 27ᵇ. The horizontal leg is welded or otherwise secured or attached to the inner face of the band 25 and is disposed between the lower portion of the band and the side branch 12 of the T-fitting 5. The vertical leg 27ᵇ of the bracket 27 extends inwardly from the horizontal leg 27ª and is secured by a bolt 31 to an integral upstanding lug 32 on the bottom portion of the ring 21. The band 25 together with the brackets 26 and 27 constitute simple means for attaching or securing the automatic draft regulator 6 to the side branch 12 of the T-fitting 5 and the ring 21 of the regulator serves as a seat for the contiguous end of the pipe section 15 and together with the band 25 and the brackets constitutes means for securing the pipe section 15 to the side branch 12 of the T-fitting. The valve plate 22 is of circular conformation and is of such diameter that when in a vertical position it closes the side branch 12 of the T-fitting 5 and prevents air from flowing into the outlet conduit *a* of the heating apparatus A. It is formed of sheet metal and has the marginal portion thereof bent outwards in the direction of the pipe section 15 so as to form an annular flange 33. Two axially aligned, horizontally extending pins 34 form a pivotal support whereby the valve plate is free to swing from a vertical or closed position into an open position wherein it extends angularly with respect to the side branch 12 of the T-fitting 5 and permits air to flow from the pipe 4 into the outlet conduit *a* of the heating apparatus. The aforementioned pins 34 are carried by and extend inwardly from the side portions of the ring 21 and project through horizontally aligned holes in the annular flange 33 of the valve plate. The inner ends of the pins are bent into circular form and are secured to the valve plate by rivets 35. Spacing washers 36 are mounted on the central portions of the pins. These washers are positioned between the ring 21 and the annular flange 33 of the valve plate and serve to hold the plate in a concentric position with respect to the ring. The pins 34 are positioned above the center of the valve plate and the common axis of the side branch 12 and the ring 21. By so positioning the pins the valve plate embodies more area or surface in the portion thereof beneath the pins than in the upper portion and consequently is tilted or swung into its open position whenever a partial vacuum is created in the pipe section 15. Whenever the partial vacuum increases in intensity as a result of an increase in draft in the heating apparatus, the valve plate of the automatic regulator swings further toward its fully open position and permits more air to flow into the outlet conduit $a$. This results in a decrease in the draft in the heating apparatus and in this manner the automatic draft regulator serves automatically to maintain a constant and uniform draft in the heating apparatus. The vertically extending leg 27$^b$ of the angle bracket 27 serves as a stop for preventing the valve plate 22 from swinging in the direction of the closure cap 18 in the event back pressure occurs in the outlet conduit $a$ as sometimes happens when the heating apparatus is not in use.

The valve plate 22 of the automatic draft regulator is provided with a counterweight 37 for properly balancing it for draft regulating purposes. This counterweight 37 is located adjacent to the upper portion of the valve plate and is mounted on one arm of a bell-crank 38. The latter, as shown in Figure 2, is pivotally connected by a pin 39 to a pair of ears 40 which are riveted or otherwise secured to the outer face of the valve plate and are horizontally aligned with the pins 34 for supporting pivotally the valve plate 22. When the counterweight is positioned near the valve plate, the plate swings easily into its open position and is so sensitive as far as opening is concerned that it operates automatically to maintain a draft of but small intensity. When the counterweight is swung away from the valve plate, its moment is such that it takes greater pressure to swing the valve plate into its open position and hence the plate serves to maintain in the heating apparatus what may be termed a "heavy" draft. By swinging the counterweight to and from the plate the plate may be counterweighted or balanced so as to maintain within the heating apparatus A a draft of any desired intensity. The swinging of the counterweight to and from the valve plate for draft adjusting purposes is effected by means of a bolt 41 and a link 42. The bolt extends transversely through a slot 43 which is formed in the bottom portion of the valve plate and extends in the direction of the ears 40. The link 42 is pivotally connected at one end to the end of the bolt 41 and at its other end to the distal end of the bell-crank arm which does not carry the counterweight 37. The bolt is slidable in the slot 43 to and from the ears 39. When the bolt is shifted toward the ears the link 42 together with the bell-crank 38 serves to swing the counterweight towards the plate. When the bolt 41 is slid away from the pivot ears 39 the link and bell-crank operate to swing the counterweight away from the plate. The bolt is provided with a nut 44 at its inner end whereby it may be clamped against the valve plate and held against sliding movement with respect to the slot 43. This nut is located adjacent to the inner face of the valve plate and is accessible upon removal of the closure cap 18 from the side branch 13 of the T-fitting 5. Whenever it is desired to set or adjust the counterweight it is only necessary to remove the closure plate 18 and then by reaching through the side branches 12 and 13 of the T-fitting loosen the nut 44 and slide the bolt to or from the pivot ears 40. An advantage and characteristic of having the automatic draft regulator 6 disposed within the side branch 12 of the T-fitting 5 is that neither the counterweight nor any of its supporting parts is exposed and consequently is not likely to be injured or accidentally knocked out of position.

In some instances, as for example when starting the heating apparatus A, it is desirable to cut off the flow of air through the pipe 4 to the outlet conduit $a$ so as to increase the draft in the furnace A. With this in view the pipe 4 is provided at its lower end with a damper 45. The latter, as shown in Figure 1, comprises a circular valve plate 46 which is mounted on a horizontally extending rod 47. This rod extends through diametrically opposite holes in the lower end of the pipe 4 and is provided at one end thereof and outside of the pipe 4 with a handle 48. When the damper 45 is in its closed position, that is when the valve plate 46 extends horizontally, no air is permitted to flow through the pipe 4 into the outlet conduit $a$ and the automatic draft regulator 6 is thus rendered ineffectual as far as the control or regulation of draft is concerned. When the damper is shifted into its open position wherein the valve plate 46 extends vertically, air is free to flow upwards through the pipe 4 into the outlet conduit 5 under the control of the automatic damper 6. By reason of the fact that the lower or inlet end of the pipe 4 is disposed over the floor of the room in which the heating apparatus A is disposed the cold air in the room is drawn into the outlet conduit and the system does not operate to draw any warm air from the room.

Should the room in which the heating apparatus is disposed become smokey as may occur during starting of the apparatus the smoke and fumes within the room may be quickly drawn out merely by closing the damper 45 and removing the cap 18. When the cap is removed and the damper is closed, the air drawn into the outlet conduit instead of coming from adjacent to the floor of the room is drawn from the intermediate or top portion of the room where the smoke is likely to be heaviest.

The herein described draft regulating system consists of but a small number of parts and also may be manufactured at a low and reasonable cost. It may be installed simply by cutting a hole in the outlet conduit of the heating apparatus and attaching the pipe section 15 to the conduit and is characterized by the fact that the automatic draft regulator which forms one of the main or essential parts thereof, although fully and completely housed so that it cannot sustain injury, is readily accessible for adjustment or setting purposes.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a system for regulating the draft in a heating apparatus having an outlet conduit for the products of combustion, the combination of means for introducing air into the conduit comprising a pipe having one end thereof open and a T-fitting having one branch thereof connected to the other end of the pipe and another of its branches provided with means for attachment to the conduit, a removable cap mounted on the third branch of the T-fitting and adapted when mounted in place to close said third branch, and an automatic draft regulator of the pivoted plate type associated with and disposed in said another branch of the T-fitting and operative automatically in response to variations or fluctuations in the pressure of the products of combustion passing through the conduit to control the flow of air through the pipe and fitting into said conduit.

2. In a system for regulating the draft in a heating apparatus having an outlet conduit for the products of combustion leading from the combustion chamber thereof to a chimney provided with a side hole therein, the combination of means for introducing air into the conduit comprising a pipe having one end thereof open and a T-fitting having the intermediate branch thereof connected to the other end of the pipe and one of its side branches adapted to register with the side hole and provided with means for attachment to the conduit, a removable cap for closing the other side branch of the T-fitting, and an automatic draft regulator positioned in said one side branch of the T-fitting so that it is accessible by way of said one side branch when the cap is removed therefrom, and operative automatically in response to variations or fluctuations in the pressure of the products of combustion passing through the conduit to the chimney to control the flow of air through the pipe and fitting into said conduit.

3. In a system for regulating the draft in a heating apparatus having an outlet conduit for the products of combustion leading from the combustion chamber thereof to a chimney provided with a side hole therein, the combination of means for introducing air into the conduit comprising a pipe having one end thereof open and a T-fitting having the intermediate branch thereof connected to the other end of the pipe and one of its side branches adapted to register with the side hole and provided with means for attachment to the conduit, a removable cap for closing the other side branch of the T-fitting, and an adjustable automatic draft regulator of the pivoted plate type disposed in said one side branch of the T-fitting so that it is accessible for adjustment purposes by way of the other branch when the cap is removed from the latter, and operative automatically in response to variations or fluctuations in the pressure of the products of combustion passing through the conduit to the chimney to control the flow of air through the pipe and fitting into said conduit.

4. In a system for regulating the draft in a heating apparatus having an outlet conduit for the products of combustion leading from the combustion chamber thereof to a chimney and provided with a side hole therein, the combination of means for introducing air into the conduit comprising a vertical pipe having one end thereof open and a T-fitting having the intermediate branch thereof connected to the upper end of the pipe and one of its side branches adapted to register with the side hole in the conduit and provided with means for attachment to said conduit, a removable cap for closing the other side branch of the fitting, and an automatic draft regulator of the pivoted plate, adjustable counterweight type arranged in said one side branch of the T-fitting so that access to the weight thereof for setting purposes may be had by way of said other side branch upon removal of the cap from the latter and operative automatically in response to variations or fluctuations in the pressure of the products of combustion passing through the conduit to the chimney to control the flow of air through the pipe and fitting into said conduit.

5. In a system for regulating the draft in a heating apparatus having a horizontal outlet for the products of combustion with a side hole therein, the combination of means for introducing air into the conduit comprising a vertical pipe having the lower end thereof open and a T-fitting having the intermediate branch thereof connected to and communicating with the upper end of the pipe and one of its side branches adapted to register with the side opening in the conduit and provided with means for attachment to said conduit, a removable closure cap for the other side branch of the fitting, an automatic draft regulator of the pivoted plate and adjustable type disposed in said one side branch of the T-fitting so that it is accessible for adjustment purposes by way of the said other side branch of the fitting upon removal of the closure cap and operative automatically in response to variations or fluctuations in the pressure of the products of combustion passing through the conduit to control the flow of air through the pipe and fitting into the conduit, and a damper in the lower end of the pipe.

THOMAS BRAY.